United States Patent
Weston et al.

(10) Patent No.: US 8,600,575 B2
(45) Date of Patent: Dec. 3, 2013

(54) APPARATUS AND METHOD FOR COLLECTING AND DISTRIBUTING POWER USAGE DATA FROM RACK POWER DISTRIBUTION UNITS (RPDUS) USING A WIRELESS SENSOR NETWORK

(75) Inventors: Patrick Edward Weston, Cameron Park, CA (US); Abraham Davis Fechter, Cameron Park, CA (US); Yann Thomas Ramin, Folsom, CA (US); Raju Pandey, Davis, CA (US)

(73) Assignee: SynapSense Corporation, Folsom, CA (US)

( * ) Notice: Subject to any disclaimer, the term of this patent is extended or adjusted under 35 U.S.C. 154(b) by 371 days.

(21) Appl. No.: 12/890,506

(22) Filed: Sep. 24, 2010

(65) Prior Publication Data

US 2012/0078429 A1    Mar. 29, 2012

(51) Int. Cl.
| | |
|---|---|
| *G05D 3/12* | (2006.01) |
| *G06F 1/00* | (2006.01) |
| *H02J 3/00* | (2006.01) |
| *H02J 3/14* | (2006.01) |
| *G06F 1/32* | (2006.01) |
| *G06F 1/30* | (2006.01) |

(52) U.S. Cl.
CPC .... *H02J 3/00* (2013.01); *H02J 3/14* (2013.01); *G06F 1/3203* (2013.01); *G06F 1/30* (2013.01)
USPC ............ 700/295; 700/286; 713/300; 713/340

(58) Field of Classification Search
USPC ............................ 700/286, 295; 713/300, 340
See application file for complete search history.

(56) References Cited

U.S. PATENT DOCUMENTS

| | | | | |
|---|---|---|---|---|
| 7,269,753 | B2 * | 9/2007 | Farkas et al. ................... | 713/340 |
| 7,363,516 | B2 * | 4/2008 | Bresniker et al. ............. | 713/300 |
| 7,386,743 | B2 * | 6/2008 | Bahali et al. ................... | 700/295 |
| 7,421,599 | B2 * | 9/2008 | Bahali et al. ................... | 700/295 |
| 7,467,311 | B2 * | 12/2008 | Bahali et al. ................... | 713/320 |
| 7,509,506 | B2 * | 3/2009 | Bahali et al. ................... | 713/300 |
| 7,992,021 | B2 * | 8/2011 | Bahali et al. ................... | 700/295 |
| 8,053,926 | B2 * | 11/2011 | Lehmann et al. ............... | 307/64 |
| 8,108,703 | B2 * | 1/2012 | Bahali et al. ................... | 700/295 |

(Continued)

OTHER PUBLICATIONS

PCT International Search Report and Written Opinion, Feb. 28, 2012, PCT/US2011/049235.

*Primary Examiner* — Mohammad Ali
*Assistant Examiner* — Kelvin Booker
(74) *Attorney, Agent, or Firm* — Inventive Patent Law P.C.; Jim H. Salter

(57) ABSTRACT

Various embodiments provide an apparatus and method for collecting and distributing power usage data from Rack Power Distribution Units (RPDUs) using a wireless sensor network. An example embodiment includes: establishing communication with a plurality of Rack Power Distribution Units (RPDUs) deployed at particular points in a facility, each RPDU of the plurality of RPDUs being configured to monitor power consumption of a plurality of electronic devices in the facility; periodically obtaining system data from each of the plurality of RPDUs, the system data including power consumption data corresponding to associated electronic devices, the system data being received from the plurality of RPDUs via a wired data connection; using a wireless bridge device to aggregate the system data from a plurality of associated RPDUs, the wireless bridge device transferring the aggregated system data to a gateway via a wireless sensor network; and using the system data to control operation of the plurality of electronic devices in the facility via the wireless bridge device and the plurality of associated RPDUs.

22 Claims, 8 Drawing Sheets

(56) References Cited

U.S. PATENT DOCUMENTS

| | | | |
|---|---|---|---|
| 8,212,395 B2* | 7/2012 | Jansma | 307/38 |
| 8,305,737 B2* | 11/2012 | Ewing et al. | 361/622 |
| 8,494,661 B2* | 7/2013 | Ewing et al. | 700/295 |
| 8,527,619 B2* | 9/2013 | Ewing et al. | 713/340 |
| 2005/0223090 A1* | 10/2005 | Ewing et al. | 713/340 |
| 2006/0164040 A1 | 7/2006 | Ohkubo | |
| 2006/0282685 A1* | 12/2006 | Bahali et al. | 700/295 |
| 2006/0282687 A1* | 12/2006 | Bahali et al. | 713/300 |
| 2007/0005994 A1* | 1/2007 | Bahali et al. | 713/300 |
| 2008/0062003 A1* | 3/2008 | Paetz | 713/300 |
| 2008/0215900 A1* | 9/2008 | Bahali et al. | 713/300 |
| 2008/0244281 A1* | 10/2008 | Felter et al. | 713/300 |
| 2009/0031051 A1* | 1/2009 | Nguyen | 713/340 |
| 2009/0031148 A1* | 1/2009 | Densham | 713/300 |
| 2009/0062970 A1 | 3/2009 | Forbes et al. | |
| 2009/0234512 A1* | 9/2009 | Ewing et al. | 700/295 |
| 2010/0005331 A1* | 1/2010 | Somasundaram et al. | 713/340 |
| 2010/0042860 A1* | 2/2010 | Kwon et al. | 713/340 |
| 2010/0127141 A1* | 5/2010 | Chan et al. | 248/220.22 |
| 2010/0142425 A1 | 6/2010 | Lee et al. | |
| 2010/0211669 A1* | 8/2010 | Dalgas et al. | 709/224 |
| 2010/0211810 A1* | 8/2010 | Zacho | 713/324 |
| 2010/0235654 A1* | 9/2010 | Malik et al. | 713/300 |
| 2011/0072289 A1* | 3/2011 | Kato | 713/324 |
| 2011/0101777 A1* | 5/2011 | Jansma | 307/38 |
| 2011/0167280 A1* | 7/2011 | Ewing et al. | 713/300 |
| 2011/0205693 A1* | 8/2011 | Jansma et al. | 361/601 |
| 2011/0218689 A1* | 9/2011 | Chan et al. | 700/295 |
| 2011/0245988 A1* | 10/2011 | Ingels et al. | 700/295 |
| 2011/0248823 A1* | 10/2011 | Silberbauer et al. | 340/10.1 |
| 2011/0291813 A1* | 12/2011 | Jansma | 340/10.5 |
| 2011/0320827 A1* | 12/2011 | Siegman et al. | 713/300 |
| 2011/0320849 A1* | 12/2011 | Cochran et al. | 713/340 |
| 2012/0011378 A1* | 1/2012 | Dalton et al. | 713/300 |
| 2012/0017102 A1* | 1/2012 | Turicchi et al. | 713/300 |
| 2012/0042180 A1* | 2/2012 | Ewing et al. | 713/300 |
| 2012/0054527 A1* | 3/2012 | Pfeifer et al. | 713/340 |
| 2012/0181869 A1* | 7/2012 | Chapel et al. | 307/64 |
| 2012/0253710 A1* | 10/2012 | Lehmann et al. | 702/61 |
| 2013/0191658 A1* | 7/2013 | Malik et al. | 713/300 |

\* cited by examiner

US 8,600,575 B2

APPARATUS AND METHOD FOR COLLECTING AND DISTRIBUTING POWER USAGE DATA FROM RACK POWER DISTRIBUTION UNITS (RPDUS) USING A WIRELESS SENSOR NETWORK

TECHNICAL FIELD

The disclosed subject matter relates to the field of device monitoring and control, and more particularly to power management of electronic devices.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009-2010 SynapSense Corporation, All Rights Reserved.

BACKGROUND

A data center can be modeled as rows of racks that house electronic systems, such as computing systems or other types of electrical devices. The computing systems (such as computers, storage devices, servers, routers, networking devices, etc.) consume power for their operation. The computing systems of the data center may reside in these racks. In a typical data center, there may be dozens or even hundreds of electrical devices. Each of these devices is connected to an electrical power source.

Data centers consume significant amounts of power, much of which is wasted in transmission and distribution, overcooling, and idle servers. Various studies have shown that about 35 W (watts) of electricity goes toward 1 W of actual work. In order to effectively utilize power in data centers and to ultimately reduce the overall power usage, it is critical to first measure how different data center equipment (e.g., servers, routers, storage equipment, cooling unit and power distribution units) consume power, and then to use the consumption information to optimize power usage.

The problem of measuring power consumption in data centers is complex for several reasons. First, the number of devices that consume power can be very large. Any solution will need to be cost effective and will need to apply to large as well as small data centers. Second, data centers use a variety of devices and mechanisms to deliver power. Any solution will need to address the heterogeneity and legacy issues in the data center. Finally, a large number of devices or systems in data centers can be idle or outdated. Some mechanism is needed to enable data center operators to remotely manage data center equipment and the power consumption of data center equipment.

In some cases, data center operators have responded by installing Smart power strips or Rack Power Distribution Units (RPDUs) that can measure power at the rack or at the plug level. Some of these RPDUs can use the Internet Protocol (IP) network to transfer this information. Unfortunately, the networking capabilities of many of the conventional RPDUs are not utilized because of the cost and complexity of connecting them to the IP network.

Thus, an apparatus and method for collecting and distributing power usage data from RPDUs using a wireless sensor network are needed.

BRIEF DESCRIPTION OF THE DRAWINGS

The various embodiments are illustrated by way of example, and not by way of limitation, in the figures of the accompanying drawings in which.

DETAILED DESCRIPTION

In the following detailed description, a reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided an apparatus and method for collecting and distributing power usage data from RPDUs using a wireless sensor network. A particular embodiment relates to a network of radio frequency (RF) devices (wireless nodes) that can include one or more sensing devices capable of sensing various system conditions. In addition, the wireless nodes can gather power usage/consumption information from RPDUs, which can be connected to the wireless node via an Ethernet or serial (e.g., wired) data connection. Then, using wireless data communications, the wireless nodes can communicate sensor information, system condition information including power consumption information, or network information with other nodes of the wireless sensor network or with a set of network controllers (e.g., gateways). The network and node configuration in a particular embodiment are described in more detail below.

The system and method of a particular embodiment involves deploying wireless sensor devices for collecting system information, including power consumption information, at different locations and levels in a data center or facility, and then using the system information to manage the consumption of electrical power within the data center.

Wireless mesh network technology can be used for deploying sensors as wireless nodes in a variety of different environments for monitoring diverse parameters such as, for example, power consumption or power usage, temperature, pressure, humidity, airflow/fluid flow, the presence of moisture, the presence of smoke or fire, electrical current, power, air quality, air particle count, and the like. These types of networks can be denoted wireless sensor networks (WSN). Each sensor in a WSN can be powered by a battery and therefore capable of operating in a wireless configuration. As described in more detail below, the sensors can constantly monitor a system and/or the environment for various system conditions and may communicate with other nodes and/or a network controller or gateway.

Figure 1:
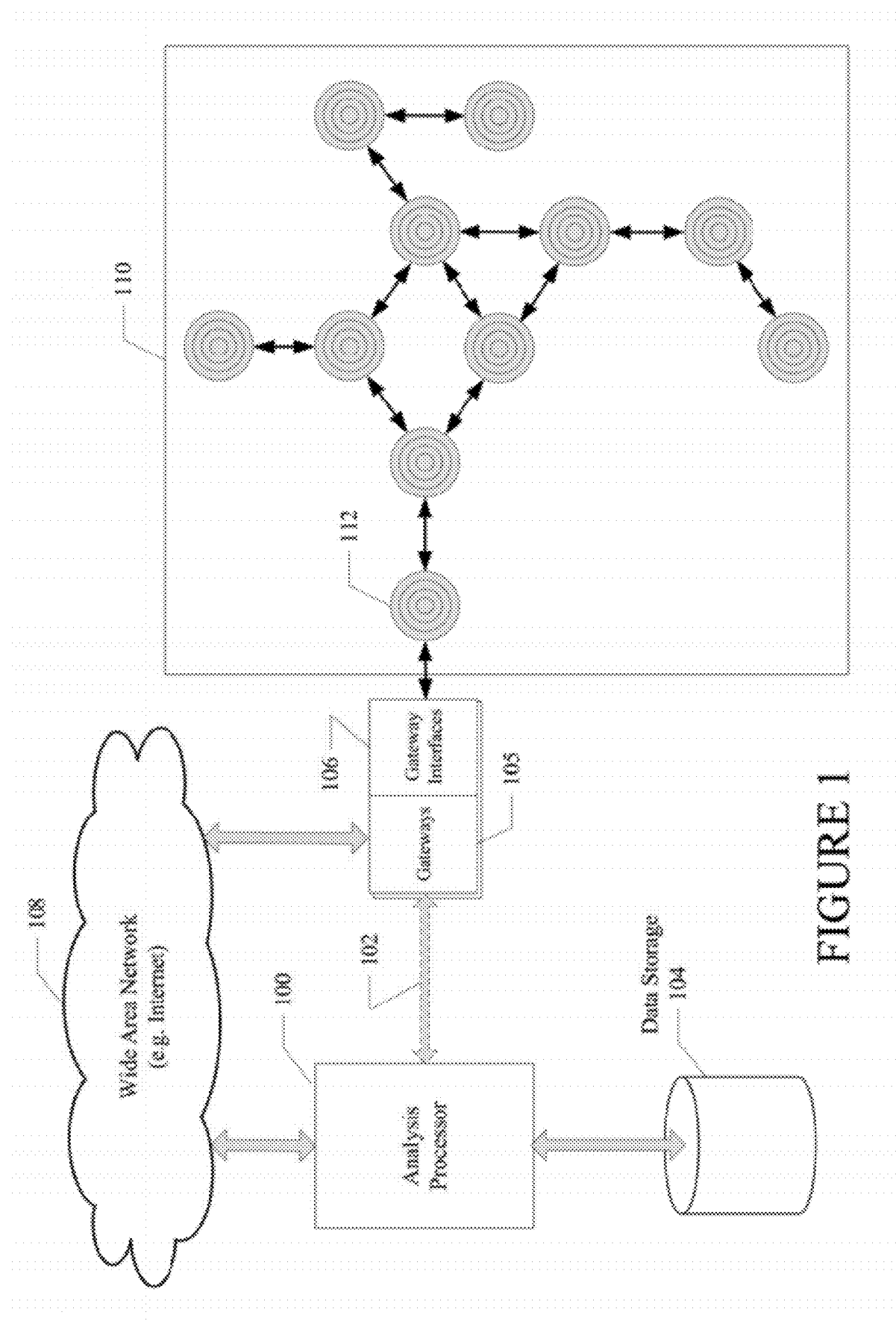
FIG. 1 illustrates a mesh network environment in which various embodiments can operate.

FIG. 1 illustrates a network environment of an example embodiment including a mesh network 110 of wireless sensors 112. Each of the sensors can be implemented as the combination of components illustrated in FIG. 2 and described in more detail below. Wireless sensor network (WSN) 110 includes a set of wireless sensors 112 (nodes), each in data communication with others of its proximate neighbor nodes. The nodes 112 can communicate using established data communication protocols, typically at the Media Access Control (MAC) Layer. The MAC Layer is one of two sub-layers that make up the Data Link Layer of the well-known OSI networking model. The MAC layer is responsible for moving data packets to and from the network interface of one node to another node, across a shared channel. A node can be any vertex or intersection in the communication network 110. A node may be passive or intelligent. In a particular embodiment, a node is assumed to be an intelligent node capable of receiving and analyzing information, taking certain actions as a result of received information, including the storing of received or processed information, modifying at least part of received information, and in some instances originating and retransmitting information. The details of a node of a particular embodiment are detailed in FIG. 2.

Referring still to FIG. 1, data packets or messages can be directed between any two nodes of the WSN 110 as each node 112 has a unique identifier. A data packet or message is a self-contained unit of transmitted information. Typically, a data packet has a header, a payload, and an optional trailer. A link is a path which originates at one node and terminates at one other node. A link or path between nodes may include multiple hops between a plurality of intermediate nodes prior to reaching a destination node. The transfer of messages between two nodes of WSN 110 in a unicast or broadcast transmission is termed a local communication.

Each of the nodes 112 of WSN 110 can also communicate with a set of gateways 105 via a gateway interface 106. The gateway 105 provides a connection between the WSN 110 and an analysis processor 100. Analysis processor 100 can be used to receive sensor data from any of the nodes 112 of WSN 110 via gateway 105 and wide-area network 108 and to analyze the sensor data for aggregated system monitoring and control. Gateway 105 and analysis processor 100 can also each provide a connection to a wide-area network 108, such as the Internet. In this manner, the analysis processor 100, the gateway 105, and the WSN 110 can obtain access to the Internet. Gateway 105 and analysis processor 100 can use a conventional data storage device 104 for data storage and retrieval. In some embodiments, an internal data connection 102 can be provided to link Gateway 105 and analysis processor 100 for data communications.

The WSN 110 can be configured in any of a variety of ways. Nodes 112 can be added, removed, or moved within the array of nodes of WSN 110. Each of the nodes 112 include functionality to join or reconfigure themselves in the WSN 110 when a node is added or moved. As part of this functionality, each node 112 can discover its neighbor nodes and automatically negotiate and establish communication paths with those neighbors. A node can be in direct data communication with neighbors that are within the radio reception range of the node. Depending on the strength of the wireless transceivers (e.g., radios) within each node 112, the distance between neighbor nodes is variable. Given that in some applications the environment in which WSN 110 is being used may be subject to radio interference, it is possible that the wireless data communications between nodes may be disrupted. In these cases, each node can sense the loss of data communications with a neighbor and may reconfigure itself to use alternate data paths through other functioning nodes of WSN 110. As such, the WSN 110 is highly adaptable to changing conditions in the environment and in the configuration of the wireless network.

Figure 2:
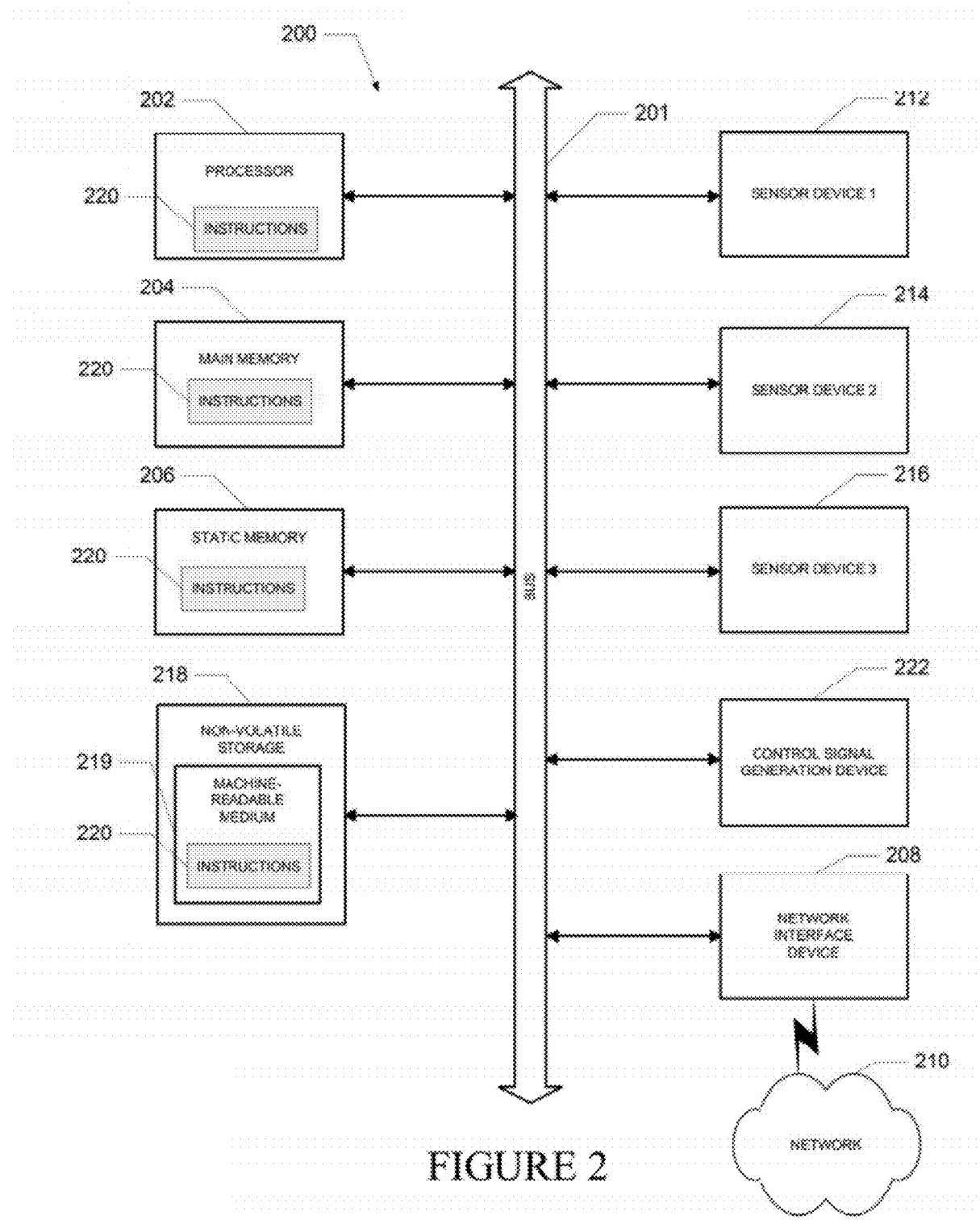
FIG. 2 illustrates an example embodiment of a node that can operate in a mesh network.

FIG. 2 shows a diagrammatic representation of a machine in the example form of a network node or sensor unit 200 within which a set of instructions, for causing the node to perform any one or more of the methodologies discussed herein, may be executed. In alternative embodiments, the node operates as a standalone device or may be connected (e.g., networked) to other machines. In a networked deployment, the node may operate in the capacity of a server or a client machine in client-server network environment, or as a peer machine in a peer-to-peer (or distributed) network environment, such as a mesh network. The node may be a computer, an intelligent sensor, a logic device, an application specific integrated circuit (ASIC), a field programmable gate array (FPGA), a hard-wired module, a network router, gateway, switch or bridge, or any machine capable of executing a set of instructions (sequential or otherwise) that specify actions to be taken by that machine. Further, while a single machine is illustrated in FIG. 2, the term "machine" or "node" shall also be taken to include any collection of machines that individually or jointly execute a set (or multiple sets) of instructions to perform any one or more of the methodologies discussed herein.

The example node 200 includes a processor 202 (e.g., a central processing unit (CPU)), a main memory 204 and optionally a static memory 206, which communicate with each other via a bus 201. The node 200 may further include one or more sensor devices 212, 214, and 216. These sensor devices can include power consumption or power usage sensors, voltage measurement devices, electrical current measurement devices, wattage measurement devices, inductance measurement devices, electromagnetic field (EMF) measurement devices, temperature sensors, humidity sensors, air pressure sensors, air flow sensors, moisture detectors, carbon monoxide detectors, fire/smoke detectors, motion detectors, seismic detectors, electrical current sensors, power sensors, air quality sensors, air particle count sensors, magnetic anomaly sensors, and/or other types of sensors for detecting and measuring a desired system or environmental condition.

The node 200 may further include a non-volatile memory 218, a control signal generation device 222, and a network interface device 208 (e.g., a radio transceiver or wireless device capable of connection with a network). The non-volatile memory 218 includes a machine-readable medium 219 in which is stored one or more sets of instructions (e.g., software and data 220) embodying any one or more of the methodologies or functions described herein. The instructions 220 may also reside, completely or partially, within the main memory 204, the static memory 206, and/or within the processor 202 during execution thereof by the node 200. The main memory 204, static memory 206, and the processor 202 also may constitute non-transitory machine-readable media. The software, instructions, and/or related data 220 may further be transmitted or received over a network 210 via the network interface device 208. The network interface device 208, in a wireless node configuration of one embodiment, may include a radio transceiver for sending and receiving data to/from network 210 using a wireless data transfer protocol, such as the family of 802.11 standards from IEEE. In this manner, node 200 can perform wireless data communications with other nodes of WSN 110. The control signal generation device 222 can be used to control the operation of a management system, such as a power management system, electrical control unit, a heating/ventilating/air conditioning (HVAC) system, a fan, a heat pump, or other device or system that can alter the power consumption or environmental conditions being monitored by sensors 212, 214, and 216.

Gateway 105 can provide synchronization timing for the nodes 112 of WSN 110. Gateway 105 can send periodic messages to each of the nodes 112 of WSN 110. These periodic messages can include a timing signal (e.g. a beacon) to which each of the nodes 112 can synchronize their internal timers. Similarly, messages from gateway 105 to each of the nodes 112 can be used to provide system status, configuration, and control settings for the nodes of WSN 110.

As described herein, an apparatus and method for collecting and distributing power usage data from RPDUs using a wireless sensor network is disclosed. The apparatus and method in a particular embodiment include using a network of wireless sensors to monitor various system conditions, including power consumption, in specific devices of a data center over time and to generate control signals to manage power consumption and related conditions. Particular example embodiments are described in more detail below.

Figure 3:
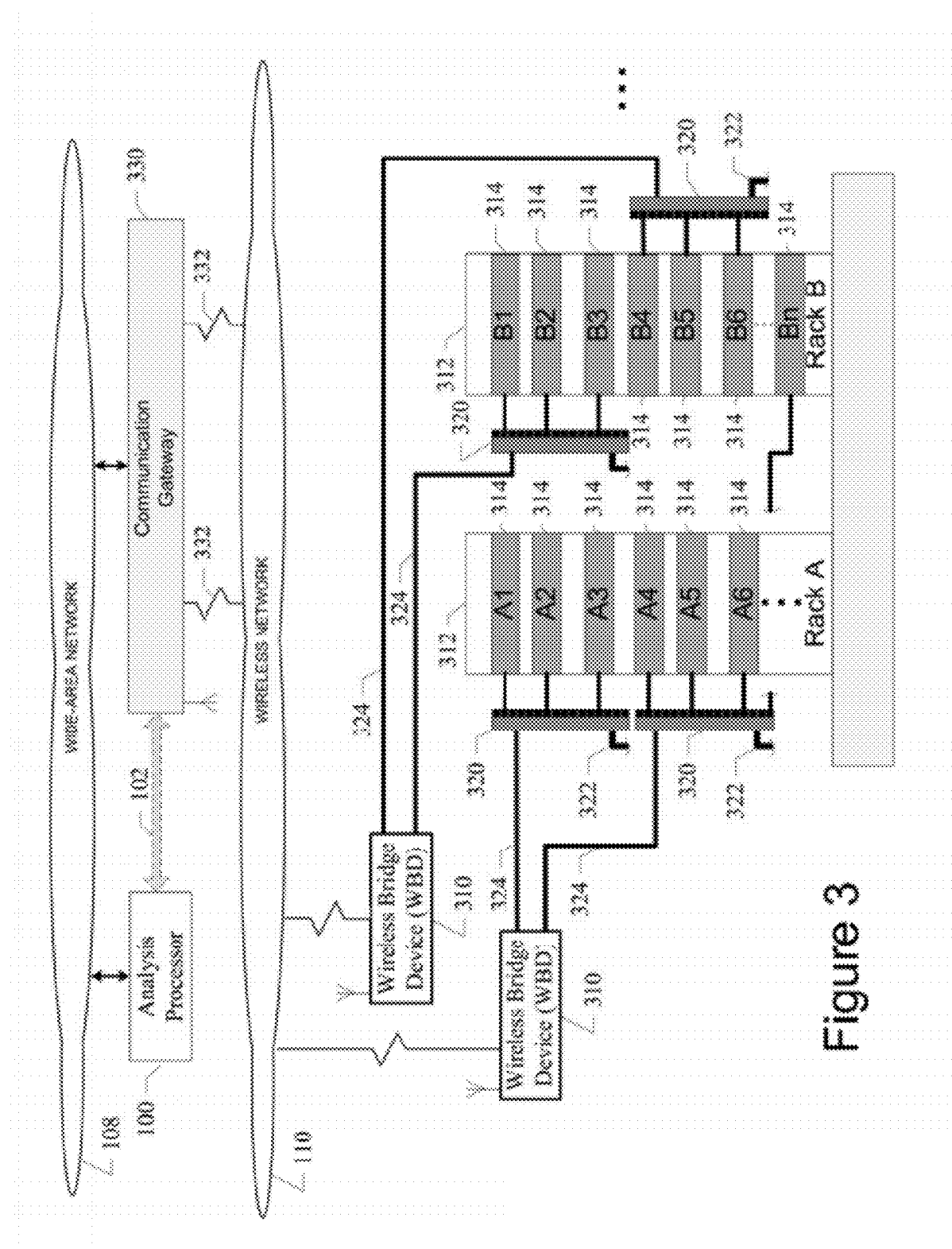
FIGS. 3 and 4 illustrate sample data center configurations of particular embodiments that include a set of racks that support stacked sets of electronic equipment, the power consumption of the electronic equipment being monitored by RPDUs, which communicate with a wireless bridge device via a wired data connection, the wireless bridge device being in wireless mesh network communication with a communication gateway.

Referring now to FIG. 3, various example embodiments of the disclosed subject matter provide an apparatus and method for cost effective and efficient measuring of power usage (including current, voltage, power, power factor, energy, etc.) of different kinds of electrical equipment in a facility (e.g., a data center). In a particular embodiment, the system includes two sets of devices: (a) RPDUs 320, and (b) Wireless bridge devices (WBD) 310. An RPDU 320 (also denoted a power distribution unit (PDU) herein) includes a series of electrical outlets or jacks for distributing electrical power for a plurality of electrical devices 314 in a rack 312 of electrical equipment. The RPDU 320 is connected to an electrical power source via electrical cable 322. The RPDU 320 also includes power measurement circuitry for sampling the electrical power consumed by electrical devices 314 connected to each of the electrical outlets. The RPDU 320 includes circuitry for converting the sampled electrical power consumption measurements into power consumption data, which can be transferred to a wireless bridge device (WBD) 310 via a data line 324. In example embodiments, the data line 324 can be an Ethernet connection or a conductor for transferring serial data to WBD 310. Conventional RPDU devices are available. For example, various types of power strips or power distribution units are available from Raritan, Eaton, APC, Hewlett Packard, CyberPower and other manufacturers and distributors. Wireless bridge devices (WBD) 310, such as those described herein, are not commercially or otherwise available from third parties.

The Wireless bridge device (WBD) 310 can include a low cost microprocessor, a wireless radio, interfaces to one or more RPDUs 320, and additional circuitry, as described below in connection with FIG. 6. In a particular embodiment, each RPDU 320 is connected to a plurality of electrical devices 314 in racks 312. Each RPDU 320 is also connected to an electrical power source via power cable or cord 322. Upon connection, the RPDU 320 measures the electrical power consumed by each device 314 to which the RPDU 320 is connected. As shown in the example of FIG. 3, RPDU 320 devices measure the power usage of electric devices (e.g., servers) A1 through A6 and B1 through Bn of racks A and B 312. Each RPDU 320 measures the electrical power consumed by each device 314 to which the RPDU 320 is connected and reports this power consumption information as system data to a set of wireless bridge devices (WBD) 310. In one embodiment, the RPDUs 320 can transfer the power consumption data to the WBDs 310 via a wired connection, such as an Ethernet or serial data connection 324. The WBD 310 can aggregate this system data and report the system data, including power consumption data, to a gateway 330 in wireless network data transmissions 332 via wireless network 110. The gateway 330 can then report the system data to an analysis processor 100 via a wide-area network 108 or via an internal data connection 102 in a particular embodiment.

FIG. 3 illustrates a data center configuration of a particular embodiment that includes a set of racks 312 that support stacked sets of electronic equipment 314. In the illustrated example, wireless sensor devices can be installed at various points proximate to racks 312. The wireless sensor devices can be implemented as the devices illustrated in FIG. 2 and described above. As described above in connection with FIGS. 1 and 2, the wireless sensor devices are wirelessly networked together in a wireless network 110 (an example of which is shown in FIG. 1) and in data communications with gateway 330, analysis processor 100, and wide-area network 108. The WBDs 310 can also be implemented as wireless sensor devices, which include the capability to interface with the RPDUs 320 as described herein. As such, the WBDs 310 can be considered wireless sensor devices and nodes in the wireless network 110. Each of the wireless sensor devices, including WBDs 310, can be configured to sense various system conditions, such as environmental conditions. In addition, the WBDs 310 can receive power usage/consumption information (including current, voltage, power, power factor, energy, etc.) and the like from the RPDUs 320. At a predetermined and configurable time interval, wireless sensor devices can measure the system conditions at each sensor location and retain the system data measurements along with a timestamp associated with each system data measurement. Using the wireless data network 110, the wireless sensor devices can transmit time-stamped system data along with a sensor identifier to the analysis processor 100 for processing. The time-stamped system data can be sent to the analysis processor 100 via a pathway of nodes in wireless network 110, gateway 330, and wide-area network 108. In this manner, the analysis processor 100 can collect the time-stamped system data from each of the wireless sensor devices installed in racks 312. It will be understood by those of ordinary skill in the art upon reading this patent disclosure that an arbitrary number of wireless sensor devices can be installed in the racks 312 in arbitrary positions within each rack of a particular data center. In general, the greater number of wireless sensor devices increases the ability for the system to detect more subtle changes in the system conditions within the data center. The analysis processor 100 can use the system data to control operation of the plurality of electronic devices 314 in the facility.

Referring still to FIG. 3, each WBD 310 can receive power consumption data from one or more RPDUs 320. The WBD 310 can then use the multi-hop mesh network (such as wireless network 110) to send the data to the analysis processor 100 via gateway 330 for data processing. In a particular embodiment, RPDUs 320 and wireless bridge devices (WBD) 310 cooperate in the following way to measure and communicate power usage information.

Each RPDU 320 is capable of sampling electrical power usage/consumption data at a plurality of power outlets or jacks to which electrical devices 314 are connected. After sampling the data, the RPDU 320 can convert the sampled measurements to power usage/consumption data, which can be transferred via a data connection 324 (e.g., a wired data connection). The RPDU 320 may also store the measured or converted power usage/consumption data, generally denoted system data, in long-term data storage on the RPDU 320 device itself. Periodically, the RPDU 320 can send the measured and converted system data to the WBD 310 to which the RPDU 320 is connected. Alternatively, the WBD 310 can poll the RPDU 320 for the power usage/consumption data. In one embodiment, a primary WBD 310 can be the WBD 310 associated with the rack 312 in which the monitored devices 314 are installed. In other embodiments, the primary WBD 310 can be the WBD 310 associated with a particular one of the plurality of RPDUs 320 at system initialization time. The primary WBD 310 can collect system data from a plurality of associated RPDUs 320. The primary WBD 310 can also collect system data wirelessly from a plurality of other WBDs 310. The primary WBD 310 can aggregate the system data and use a multi-hop mesh network (such as wireless network 110) to send the system data to the analysis processor 100 via gateway 330 for data processing.

Figure 4:
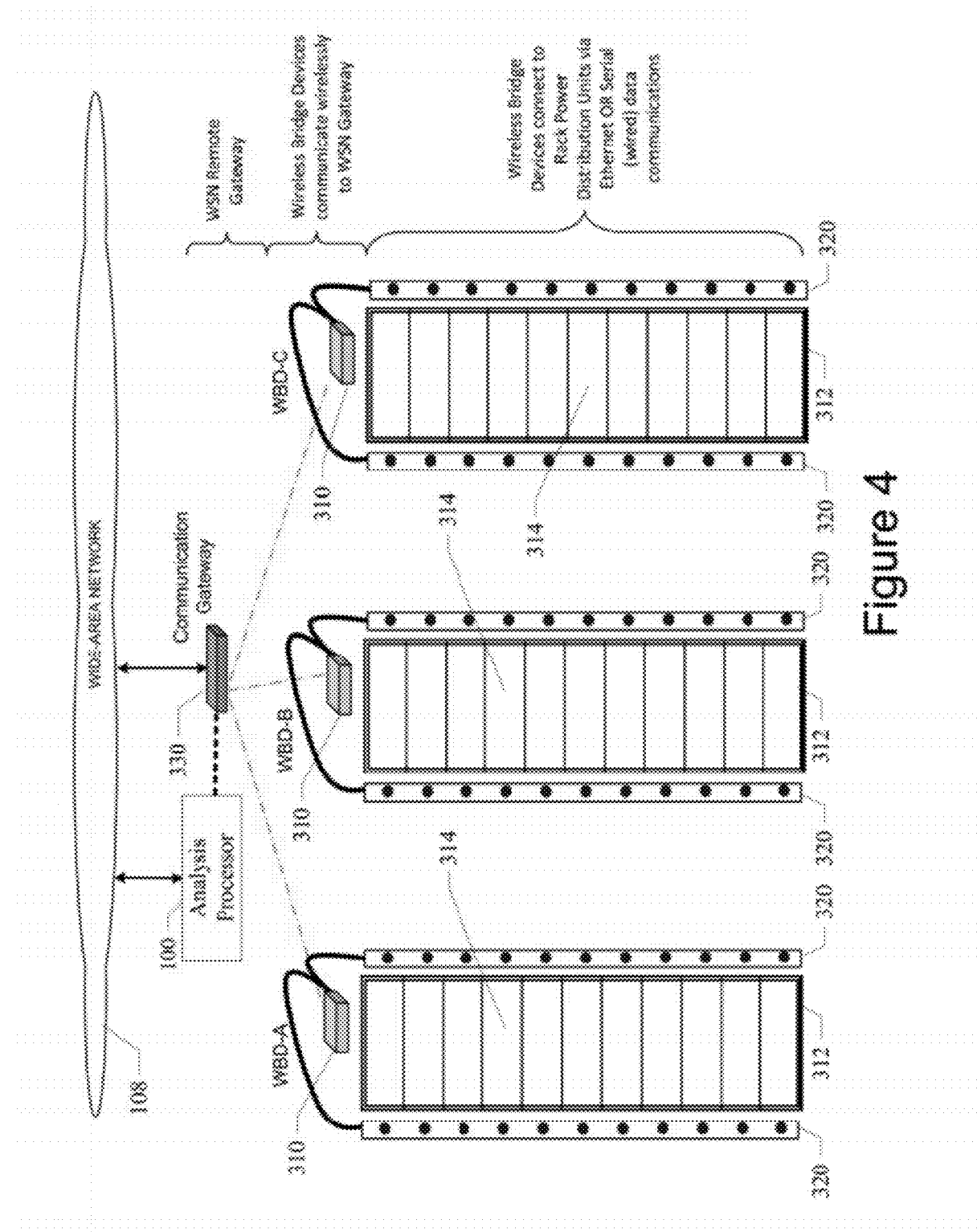

Referring now to FIG. 4, a data center configuration of another embodiment includes a set of racks 312 that support stacked sets of electronic equipment 314. In the illustrated example, RPDUs 320 have been installed with power outlets or jacks for each of the electronic devices 314 residing in racks 312. The RPDUs 320 are each coupled between an electrical power source via electrical cable 322 and a corresponding set of the electronic devices 314. As described above, each WBD 310 can receive system data, including power consumption data, from one or more RPDUs 320. The WBD 310 can then use the multi-hop mesh network (such as wireless network 110) to send the data to the analysis processor 100 via gateway 330 and wide-area network 108 for data processing.

Figure 5:
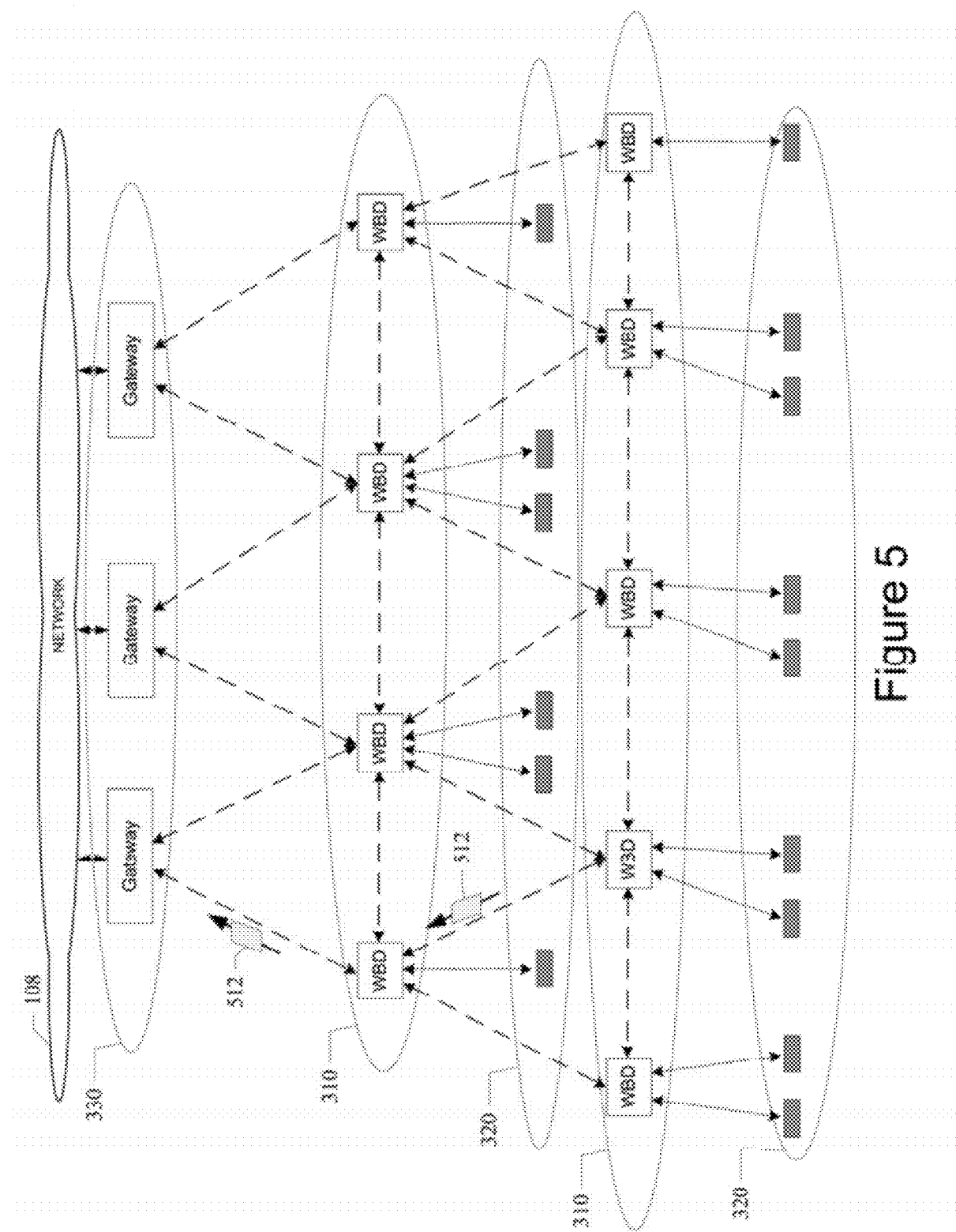
FIG. 5 illustrates a layout of an example data center in which an array of RPDUs and wireless bridge devices have been deployed.

Referring now to FIG. 5, a particular embodiment uses a multi-tier communication architecture for collecting and distributing information. As shown in FIG. 5, there can be two networks: a local network (represented in FIG. 5 with dotted lines between RPDUs 320 and wireless bridge devices (WBD) 310); and a global network (represented in FIG. 5 with dashed lines between wireless bridge devices (WBD) 310 and gateways 330). In a particular embodiment, the local network consists of a set of RPDUs 320 and an associated primary WBD 310. The local network is managed by the primary WBD 310. The primary WBD 310 is responsible for initiating, synchronizing, scheduling, and managing data communication in the local network. As shown in FIG. 5, data transfer in the local network takes place between an RPDU 320 and the primary WBD 310. As shown in FIG. 5, for example, the RPDUs 320 form a local communication network with the primary WBD 310 to which the RPDUs 320 are connected. The primary WBD 3102 manages the local network. Similarly, other collections of RPDUs 320 form local networks with their corresponding primary WBD 310.

In a particular embodiment, the global network is a multi-hop mesh network that integrates a plurality of wireless bridge devices (WBD) 310 with one or more gateways 330. An example embodiment is shown in FIG. 5. The global network is used to distribute system data that is collected by the RPDUs 320 or other wireless sensor devices that may be in wireless data communication with the wireless bridge devices (WBD) 310. As shown in FIG. 5, a plurality of wireless bridge devices (WBD) 310 forms a global network with one or more gateways 330. The global network is used to transfer system information to the gateways 330 and the analysis processor 100 in a multi-tiered communication architecture.

In an example embodiment, such as the example embodiment shown in FIG. 5, data transfer between network nodes (e.g., the wireless bridge devices (WBD) 310 and gateways 330) takes place in two general phases: a data collection phase and a data aggregation phase. In the data collection phase, the WBDs 310 collect power related information (system data) periodically from the electronic devices 314 via the RPDUs 320 to which the electronic devices 314 are connected. The RPDUs 320 may be able to aggregate some of this system data locally. At pre-configured intervals or upon request from another network device, the RPDUs 320 can send the aggregated system data to their primary WBD 310. In the data aggregation phase, the wireless bridge devices (WBD) 310 can collect aggregated system data from a plurality of RPDUs 320. The wireless bridge devices (WBD) 310 can aggregate the collected system data. At pre-configured intervals or upon request from another network device, the wireless bridge devices (WBD) 310 can send the collected system data to the gateway 330 using the global network described above. An example of the routing of the system data is shown in FIG. 5 as a routing of a network data message 512 through the local and global networks as described herein.

FIG. 5 illustrates a layout of an example data center in which an example array of RPDUs 320 has been deployed. A typical deployment can include an array of networked devices (including wireless bridge devices (WBD) 310 and gateways 330) in a distributed network architecture. In a particular example embodiment, the system described herein can include several kinds of devices, including wireless sensor devices, RPDUs 320, wireless bridge devices (WBD) 310, gateways 330, routers, controllers, and the like that are distributed in the data center. FIG. 5 illustrates such an example system. Gateways 330 can connect the RPDUs 320 to a wide-area network 108, such as an Internet Protocol (IP) network including the Internet, via wireless bridge devices (WBD) 310. Gateways 330 typically have communication paths to all sensing and control devices in a particular system. Gateways 330 can send commands, status information, or data center relevant information to the other network devices (e.g., WBDs 320).

In a particular embodiment, an example system can include a centralized software system, called the Analysis Processor 100 (shown in FIG. 1), which stores all of the sensing, control, and status information that is forwarded to the gateways 330 by the other system devices (310 and 320). The Analysis Processor 100 is primarily a repository of information and system-wide data processing for the system. In some embodiments, the Analysis Processor 100 can also control the electronic devices 314 in a particular facility in order to affect the overall power consumption of the facility. The wireless bridge devices (WBD) 310 and gateways 330, denoted generally herein as the network devices, cooperate to establish a mesh data communications network that provides connectivity among the network devices.

Figure 6:
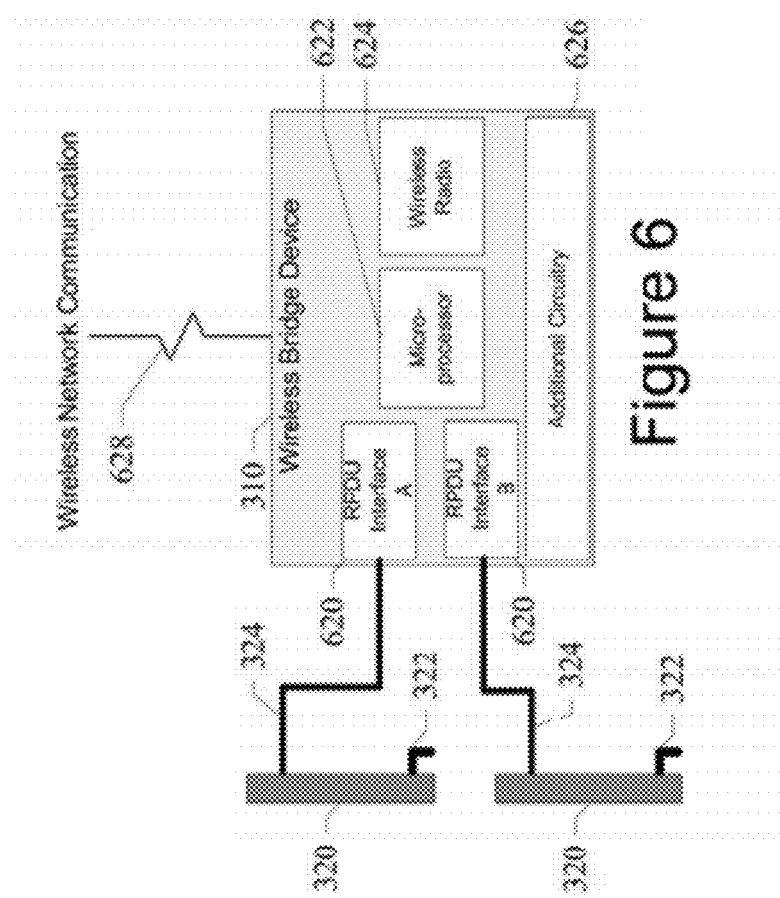
FIG. 6 illustrates an example embodiment of a wireless bridge device that can operate in a mesh network of various embodiments.

FIG. 6 illustrates an example embodiment of a wireless bridge device (WBD) 310 that can operate in a wireless sensor network of various embodiments. In a typical data center, electronic devices 314 (e.g., servers) residing in racks 312 are typically powered via electrical power cords or cables that attach to the electronic device 314 on one side and to an RPDU or Power Distribution Unit (PDU) 320 on another side. As described above, the RPDU 320 of an example embodiment is connected to an electrical power source via electrical cable 322. The RPDU 320 also includes power measurement circuitry for sampling the electrical power consumed by electrical devices 314 connected to each of the electrical outlets of the RPDU 320. The RPDU 320 includes circuitry for converting the sampled electrical power consumption measurements into power consumption data, which can be transferred to the wireless bridge device (WBD) 310 via a data line 324. In example embodiments, the data line 324 can be an Ethernet connection or a conductor for transferring serial data to WBD 310.

Referring to FIG. 6, a WBD 310 of an example embodiment is shown to include one or more RPDU interfaces or Power Distribution Unit (PDU) interfaces 620, one or more low cost microprocessors 622, a wireless radio 624, and additional circuitry 626. A WBD 310 can be connected to an RPDU 320 via data line 324 and RPDU interface 620. Upon connection, the RPDU 320 uses its power measurement circuitry to measure the electrical power consumed by the electronic devices 314 to which the RPDU 320 is connected. The electrical power usage/consumption data can be retained in a memory of the RPDU 320 and ultimately sent from the RPDU 320 to the WBD 310.

In one example embodiment, the WBD 310 includes two microprocessors 622: one to run an IP network stack, and another microprocessor 622 to run a 15.4 network stack. The WBD 310 includes a wireless radio 624 and one or more RPDU interfaces 620 for connecting with RPDUs 320. Additional circuitry 626 can also be provided for storing processed power usage/consumption data or for sensing other environmental conditions in a manner similar to a wireless sensor device as described above. The RPDU interfaces 620 of the WBD 310 can also include a number of serial and/or IP ports, which can be used to connect the WBD 310 with a number of RPDUs 320. As shown in the particular embodiment of FIG. 7, the WBD 310 is connected with two RPDUs 320 via data connections 324. In general, a WBD 310 can be connected with several RPDUs 320, limited primarily by the number of ports available on a particular WBD 310.

Figure 7:
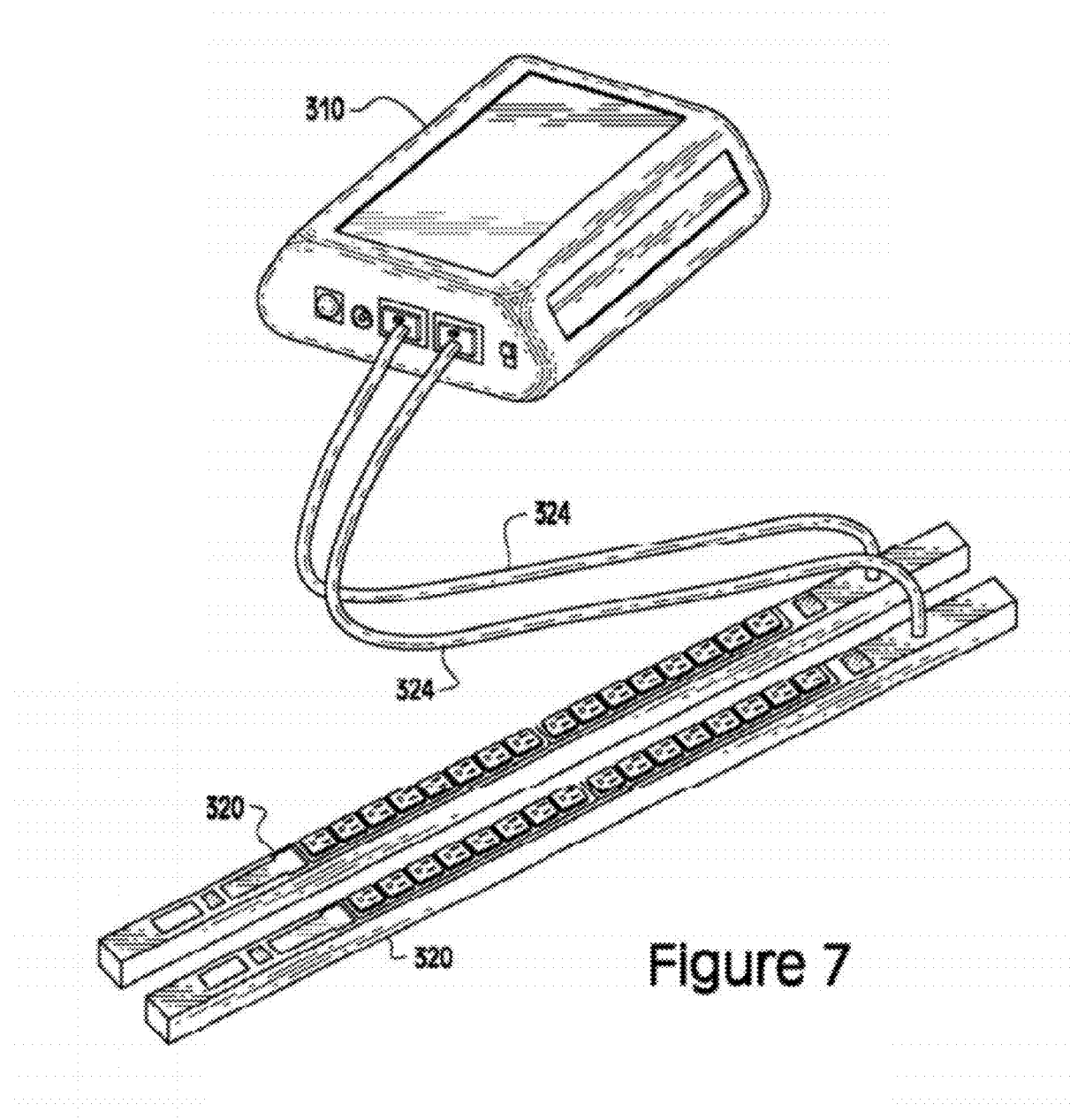
FIG. 7 illustrates a wireless bridge device in an example embodiment.

Referring again to the particular embodiment of FIG. 7, the electronics that implement the processing and radio functions of the WBD 310 can be housed in a Poly Carbonate-acrylonitrile butadiene styrene (PC-ABS) plastic module. Each WBD 310 has a unique identifier (ID) that is provided during manufacturing that is embedded electronically and is bar-coded on the outside of the device. As described above, each WBD 310 includes one or more RPDU interfaces or Power Distribution Unit (PDU) interfaces 620, one or more low cost microprocessors 622, a wireless radio 624, and additional circuitry 626. The wireless radio 624 of a particular embodiment contains a 2.4 GHz ISM band transceiver and an embedded microcontroller 622. The network stack and data management firmware is housed in and executed by the microcontroller 622. An internal antenna supports the wireless radio 624. An on-board battery or a separate power cord and external 24VDC power adapter can provide power for the electronics of the WBD 310.

In one embodiment, the hardware architecture of the WBD 310 includes several serial and IP ports associated with an embedded IP microprocessor. The IP microprocessor manages the interconnection with RPDUs 320. Each WBD 310 can also contain a microprocessor for wireless network processing and a radio 624 that is used to form a mesh wireless network and to transfer the collected power usage/consumption data from the RPDUs 320. In particular embodiments, RPDUs 320 generally provide two interfaces for transferring power usage/consumption data: Ethernet ports that provide Simple Network Management Protocol (SNMP) or Web access, and RS232 serial ports that provide access to registers that contain the required data. Each WBD 310 can have one or more RS232 serial ports (provided via interfaces 620); each port can be attached to an RPDU 320 as data center racks often have two power strips for each rack. The data rates are generally around 19200 bps and higher. The WBD 310 can auto baud to adapt to the configured data rate of the RPDU 320. In cases where DC power is supplied via the serial port, a WBD 310 can derive power from the RPDU 320. Each WBD 310 can also include one or more Ethernet ports (provided via interfaces 620). Each port can be attached to IP ports on the RPDUs 320. The firmware on the WBD 310 can use SNMP or Web Services protocols to connect with each RPDU 320, and collect information. Upon connection, the WBD 310 can discover the characteristics of the RPDU 320, and can use communication protocols (such as SNMP) to collect data from the RPDU 320. Each WBD 310 can also provide an environmental sensing harness interface to allow an optional environmental sensing capability.

In an example embodiment, a WBD 310 manages the local communication network that includes a set of RPDUs 320. In addition, the WBD 310 collects power data from the RPDUs 320 and uses the global network to transmit the information to a centralized location for storage and processing. Each WBD 310 can periodically poll the associated RPDUs 320 and collect power and status data (system data) from them. The WBD 310 can aggregate the collected information and assemble the system data into network data packets. The WBD 310 can then send the data packets using the mesh network 110 to a central server (e.g., analysis processor 100) where the system data can be processed. The WBD 310 may also receive a command from a central server (e.g., analysis processor 100). The WBD 310 can then use the identity of a particular RPDU 320 to identify the specific RPDU 320 and forward the command to the specific RPDU 320. In this manner, the analysis processor 100 can control a specific RPDU 320 via the WBD 310 and the wireless network 110.

Wireless bridge devices (WBD) 310 can have a display to show current status and may allow parameters to be selected during the installation process. Push buttons can be provided to set the mode of operation and provide installation functions.

Before the WBD 310 and its associated RPDUs 320 can be used, they need to be configured. Configuration involves associating a specific WBD 310 with a set of RPDUs 320, and the outlet/equipment/rack to which a particular RPDU 320 is attached. A configuration tool is used to record and store this information. In one embodiment, the configuration process involves three distinct steps: (i) Identification, (ii) WBD 310 and RPDU 320 association, and (iii) RPDU 320 discovery. These three phases of the configuration process in an example embodiment are described in more detail below.

Identification involves collecting the identifier associated with each RPDU 320 and storing the identifier with the configuration tool. This can be achieved in one of the several ways: 1) manually associate a rack number with each RPDU 320. Also, associate a unique identifier with each RPDU 320. Store the rack number and the unique identifier in the configuration tool; or 2) the configuration tool can include a bar code scanner, which is used to scan the bar code associated with each RPDU 320 and the corresponding rack.

Association involves creating a relation between an RPDU 320 and a WBD 310. Every RPDU 320 needs to be associated with a WBD 310. This association is used to determine which RPDU 320 is used to measure power of which rack or collection of electric devices 314. The process involves associating a unique identifier of the RPDU 320 with the unique identifier of the WBD 310. A configuration tool (e.g., a software application) can be used for this process. This association can take place in one of the several ways in an example embodiment: 1) the configuration tool records the unique identifier of the RPDU 320, the unique identifier of the WBD 310, port type (serial or IP), and port number on which the RPDU 320 is attached; or 2) the configuration tool uses absolute location information or relative location information of the RPDU 320 to associate the RPDU 320 with the corresponding WBD 310.

The discovery process in an example embodiment involves a WBD 310 learning the meta-information (or Management Information Base (MIB) in SNMP terminology) associated with an RPDU 320. The meta-information is used to receive data from or send commands to the RPDU 320. The discovery can take place in one of the several ways: 1) each WBD 310 is pre-loaded with meta-information about a wide variety of RPDUs 320. During the association process, the configuration tool specifies the manufacturer of the particular RPDU 320. The manufacturer information is then downloaded into each WBD 310 using the mesh network 110. The WBD 310 uses this information to select meta-information specific to the particular RPDU 320, and then uses the selected meta-information to interact with the particular RPDU 320; 2) the configuration tool is used to identify the manufacturer information associated with each RPDU 320. The configuration tool then uses the association between a specific RPDU 320 and a corresponding WBD 310 to determine the kind of meta-information that will be needed by the WBD 310. The configuration tool then uses the mesh network 110 to download specific meta-information into the WBD 310; or 3) each WBD 310 stores a pattern of possible meta-information for a variety of RPDUs 320. The WBD 310 periodically probes each RPDU 320 by sending commands, and examining the results. Based on the results, the WBD 310 learns the meta-information about each RPDU 320. The process here is completely automated.

As described herein, the various embodiments enable several advantages. These advantages are summarized below:

The various embodiments provide a mechanism for separating the power measurement infrastructure from the communication infrastructure, and for combining the two infrastructure components in several ways. This enables aggregation of power measurement readings and their communication through a single network infrastructure.

The various embodiments provide a low cost method for collecting data from standard RPDUs or power distribution units.

The various embodiments use a self-discovery mechanism to learn information about the RPDUs or power distribution units.

The various embodiments use a low cost multi-hop wireless infrastructure for data distribution, which makes the power measurement infrastructure easier to deploy and integrate.

The various embodiments use a multi-level wireless network to collect power information and distribute the information to different nodes.

The various embodiments eliminate the need to wire the communication infrastructure.

The various embodiments provide techniques for configuring the power and communication network so that the apparatus can be used to provide power usage information at multiple levels.

Figure 8:
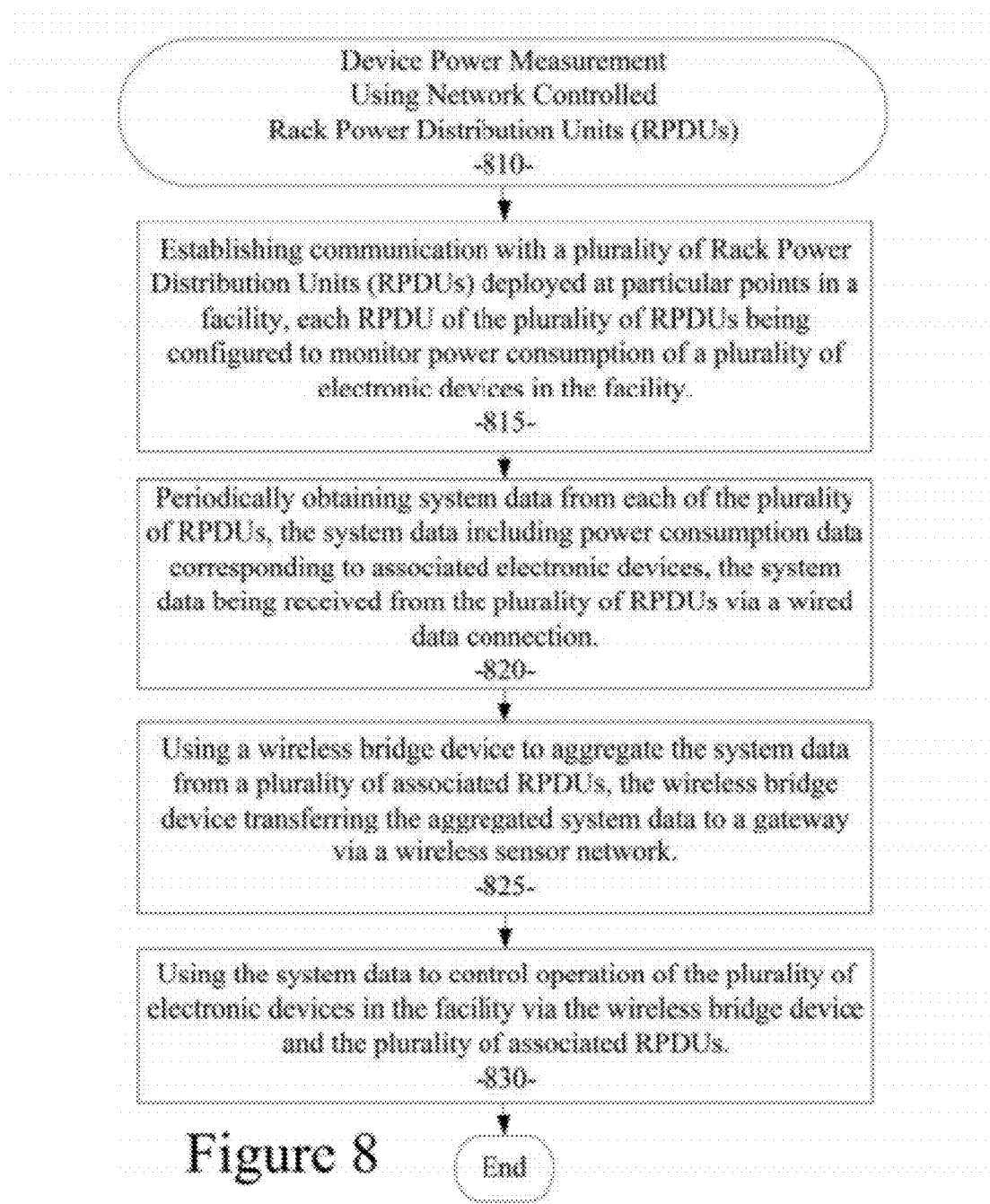
FIG. 8 is a flow diagram illustrating the basic processing flow for a particular embodiment.

FIG. 8 is a flow diagram illustrating the basic processing flow 810 for a particular embodiment. As shown, an example embodiment includes: establishing communication with a plurality of Rack Power Distribution Units (RPDUs) deployed at particular points in a facility, each RPDU of the plurality of RPDUs being configured to monitor power consumption of a plurality of electronic devices in the facility (processing block 815); periodically obtaining system data from each of the plurality of RPDUs, the system data including power consumption data corresponding to associated electronic devices, the system data being received from the plurality of RPDUs via a wired data connection (processing block 820); using a wireless bridge device to aggregate the system data from a plurality of associated RPDUs, the wireless bridge device transferring the aggregated system data to a gateway via a wireless sensor network (processing block 825); and using the system data to control operation of the plurality of electronic devices in the facility via the wireless bridge device and the plurality of associated RPDUs (processing block 830).

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations. Accordingly, the term "module" should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 219 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or embodying a set of instructions for execution by the machine and that cause the machine to perform any one or more of the methodologies described herein. The term "machine-readable medium" shall accordingly be taken to include, but not be limited to, solid-state memories, optical media, and magnetic media.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described above, an apparatus and method for collecting and distributing power usage data from RPDUs using a wireless sensor network is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A method comprising:
    establishing communication with a plurality of Rack Power Distribution Units (RPDUs) deployed at particular points in a facility, each RPDU of the plurality of RPDUs being configured to monitor power consumption of a plurality of electronic devices in the facility;
    periodically obtaining system data from each of the plurality of RPDUs, the system data including power consumption data corresponding to associated electronic devices, the system data being received from the plurality of RPDUs via a wired data connection;
    using a wireless bridge device to aggregate the system data from a plurality of associated RPDUs, the wireless bridge device transferring the aggregated system data to a gateway via a wireless sensor network;
    routing the system data in messages between nodes of the wireless sensor network by transiting through at least one intermediate node of the wireless sensor network; and
    using the system data to control operation of the plurality of electronic devices in the facility via the wireless bridge device and the plurality of associated RPDUs.

2. The method as claimed in claim 1 wherein the system data includes measured environmental data.

3. The method as claimed in claim 1 wherein the power consumption data includes voltage, electrical current, power, power factor, and energy data.

4. The method as claimed in claim 1 including routing the system data to an analysis processor via the gateway.

5. The method as claimed in claim 1 including routing the system data to an IP network via the wireless sensor network.

6. The method as claimed in claim 1 wherein each of the plurality of networked RPDUs being controlled by commands sent via, the wireless sensor network.

7. An article of manufacture comprising a non-transitory machine-readable storage medium having machine executable instructions embedded thereon, which when executed by a machine, cause the machine to:
    establish communication with a plurality of Rack Power Distribution Units (RPDUs) deployed at particular points in a facility, each RPDU of the plurality of RPDUs being configured to monitor power consumption of a plurality of electronic devices in the facility;
    periodically obtain system data from each of the plurality of RPDUs, the system data including power consumption data corresponding to associated electronic devices, the system data being received from the plurality of RPDUs via a wired data connection;
    use a wireless bridge device to aggregate the system data from a plurality of associated RPDUs, the wireless bridge device transferring the aggregated system data to a gateway via a wireless sensor network;
    route the system data in messages between nodes of the wireless sensor network by transiting through at least one intermediate node of the wireless sensor network; and
    use the system data to control operation of the plurality of electronic devices in the facility via the wireless bridge device and the plurality of associated RPDUs.

8. The article of manufacture as claimed in claim 7 wherein the system data includes measured environmental data.

9. The article of manufacture as claimed in claim 7 wherein the power consumption data includes voltage, electrical current, power, power factor, and energy data.

10. The article of manufacture as claimed in claim 7 being further configured to route the system data to an analysis processor via the gateway.

11. The article of manufacture as claimed in claim 7 being further configured to route the system data to an IP network via the wireless sensor network.

12. The article of manufacture as claimed in claim 7 wherein each of the plurality of networked RPDUs being controlled by commands sent via the wireless sensor network.

13. A system comprising:
an analysis processor in data communication via a wide-area network;
a gateway in data communication via the wide-area network and a wireless sensor network;
a wireless bridge device in data communication via the wireless sensor network; and
a plurality of networked Rack Power Distribution Units (RPDUs) deployed at particular points in a facility, each RPDU of the plurality of networked RPDUs being configured to monitor power consumption of a plurality of electronic devices in the facility; the wireless bridge device being configured to periodically obtain system data from associated RPDUs of the plurality of networked RPDUs via a wired data connection, the system data including power consumption data corresponding to associated electronic devices; the wireless bridge device being configured to aggregate the system data from the associated RPDUs, the wireless bridge device transferring the aggregated system data to the gateway via the wireless sensor network; the wireless sensor network routing the system data in messages between nodes of the wireless sensor network by transiting through at least one intermediate node of the wireless sensor network; and the analysis processor being configured to use the system data to control operation of the plurality of electronic devices in the facility.

14. The system as claimed in claim 13 wherein the system data includes measured environmental data.

15. The system as claimed in claim 13 wherein the power consumption data includes voltage, electrical current, power, power factor, and energy data.

16. The system as claimed in claim 13 being further configured to route the system data to an analysis processor via the gateway.

17. The system as claimed in claim 13 being further configured to route the system data to an IP network via the wireless sensor network.

18. The system as claimed in claim 13 wherein each of the plurality of networked RPDUs being controlled by commands sent via the wireless sensor network.

19. A method for configuring a plurality of networked Rack Power Distribution Units (RPDUs) to monitor power consumption of a plurality of electronic devices in a facility, the method comprising:
collecting identification and location information associated with each of a plurality of RPDUs deployed in a facility;
associating each of the plurality of RPDUs with a corresponding one of a plurality of wireless bridge devices in data communication with a wireless sensor network, the associating including creating a relation between the identification and location information associated with each of the plurality of RPDUs and identification information associated with a corresponding one of the plurality of wireless bridge devices;
configuring nodes of the wireless sensor network to route system data in messages between nodes of the wireless sensor network by transiting through at least one intermediate node of the wireless sensor network; and
using a discover process to obtain meta-information related to each RPDU of the plurality of RPDUs, the meta-information enabling each of a plurality of RPDUs to communicate with a corresponding one of the plurality of wireless bridge devices.

20. The method as claimed in claim 19 wherein the location information includes a rack number associated with each of the plurality of RPDUs deployed in the facility.

21. The method as claimed in claim 19 including using a configuration tool to associate each of the plurality of RPDUs with a corresponding one of the plurality of wireless bridge devices.

22. The method as claimed in claim 19 wherein the discovery process includes using a wireless bridge device to probe an RPDU to automatically learn the meta-information related to the RPDU.

* * * * *